United States Patent
Lee

[11] Patent Number: 6,028,747
[45] Date of Patent: Feb. 22, 2000

[54] HEAD DRUM ASSEMBLY HAVING A MEMBER LOCATING AND FIXING VIDEO HEADS ON AN UPPER DRUM

[75] Inventor: Sang-Jin Lee, Seoul, Rep. of Korea

[73] Assignee: Daewoo Electronics Co., Ltd., Seoul, Rep. of Korea

[21] Appl. No.: 09/045,937

[22] Filed: Mar. 23, 1998

[30] Foreign Application Priority Data

Mar. 26, 1997 [KR] Rep. of Korea ........................ 97-10577

[51] Int. Cl.[7] ....................................................... G11B 5/52
[52] U.S. Cl. ................................................................ 360/107
[58] Field of Search ................................................. 360/107

[56] References Cited

U.S. PATENT DOCUMENTS 5,010,432  4/1991  Fukushima ................................ 360/107
5,859,752  1/1999  Cho .......................................... 360/107

*Primary Examiner*—A. J. Heinz
*Attorney, Agent, or Firm*—Pennie & Edmonds LLP

[57] ABSTRACT

A video cassette recorder provided with a head drum assembly whose structure is modified to ensure an easy and simple placement of each head base having a through hole and a video head is disclosed. The structure is provided with a rotational drum having through holes, an integral base locating member for locating the head bases beneath the rotational drum, a rotor transformer, and connecting pins for connecting each of the head bases to the rotor transformer. The upper ends and the lower ends of the connecting pins come into contact with a printed circuit board fixed under the head base and electrical contacts on the rotor transformer, respectively.

10 Claims, 5 Drawing Sheets

HEAD DRUM ASSEMBLY HAVING A MEMBER LOCATING AND FIXING VIDEO HEADS ON AN UPPER DRUM

FIELD OF THE INVENTION

The present invention relates to a video cassette recorder ("VCR"); and, more particularly, to a head drum assembly having a structure capable of ensuring an easy and simple placement of each head base therein.

BACKGROUND OF THE INVENTION

In general, a video cassette recorder includes a head drum assembly incorporating therein a video head which is used to read/write signals from/onto a magnetic tape running along a predetermined travel path on a deck.

One example of the conventional head drum assemblies is shown in FIG. 1. As shown, the head drum assembly is largely divided into a rotational drum 3 on which a video head 6 is mounted and a stationary drum 1 which is fixed to the deck (not shown). As well known in the art, the video head 6 has to be precisely placed on the head drum assembly, taking into consideration such as its vertical position with respect to the head drum assembly, a degree of the video head's protruding out of a lateral surface of the head drum assembly, etc.

As shown in FIG. 2, a head base 5 is mounted on the rotational drum 3 through the use of a fixing thread 5a which is driven into a threaded hole 5c via the head base 5. In order to adjust a height of the head 6, an adjusting thread 5b is further provided. A printed circuit board ("PCB") 8 for transferring electric signals from/to the head 6 is mounted under the head base 5.

Further, a stator transformer 7a is installed in a stator transformer groove of the stationary drum 1 and a rotor transformer 7b is attached to a protruding annular portion of the rotational drum 3. The transformers 7a, 7b are capable of providing and receiving signals to and from each other. The rotor transformer 7b is also electrically communicates with the head 6 through electric wires 9. The wires 9 are soldered to the rotor transformer 7b and the PCB 8.

However, the head drum assembly constructed in this manner has a shortcoming in that a flux resulting from soldering the electric wires detrimentally affect the reading/writing signlals from/onto the video head. Further, since, the head bases are separately assembled on the rotational drum, the assembling time and the process thereof are long and tedious.

SUMMARY OF THE INVENTION

It is, therefore, a primary object of the present invention to provide a head drum assembly for use in a VCR, the head drum assembly having a structure capable of ensuring an easy and simple placement of each head base therein.

The above and other objects of the invention are accomplished by providing a head drum assembly whose structure is modified to ensure an easy and simple placement of each head base having a through hole and a video head therein, said structural modification comprising: a rotational drum having through holes; an integral base locating means for locating each head base beneath the rotational drum; a rotor transformer having a plurality of electrical contacts thereon; and connecting pins for electrically connecting a printed circuit board fixed under each head base to the rotor transformer.

BRIEF DESCRIPTION OF THE DRAWINGS

The above and other objects and features of the instant invention will become apparent from the following description of preferred embodiment taken in conjunction with the accompanying drawings, in which.

DETAILED DESCRIPTION OF THE PREFERRED EMBODIMENT

Figure 1:
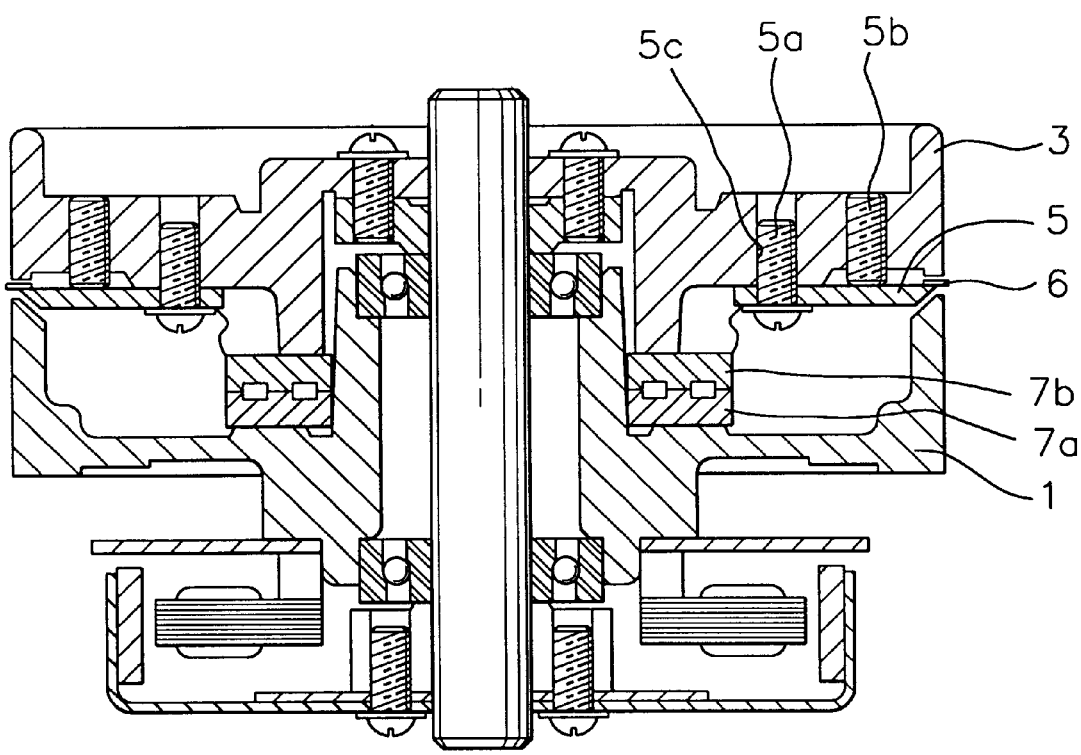
FIG. 1 describes a sectional view of a conventional head drum assembly.
Figure 2:
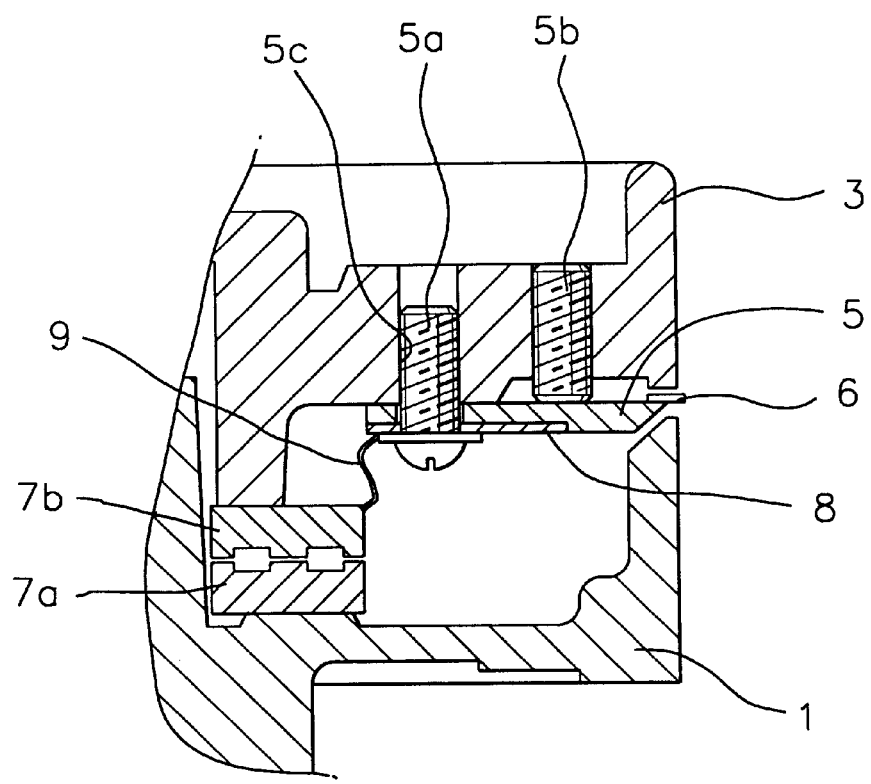
FIG. 2 illustrates a partially enlarged view of a head base retaining structure in FIG. 1.
Figure 3:
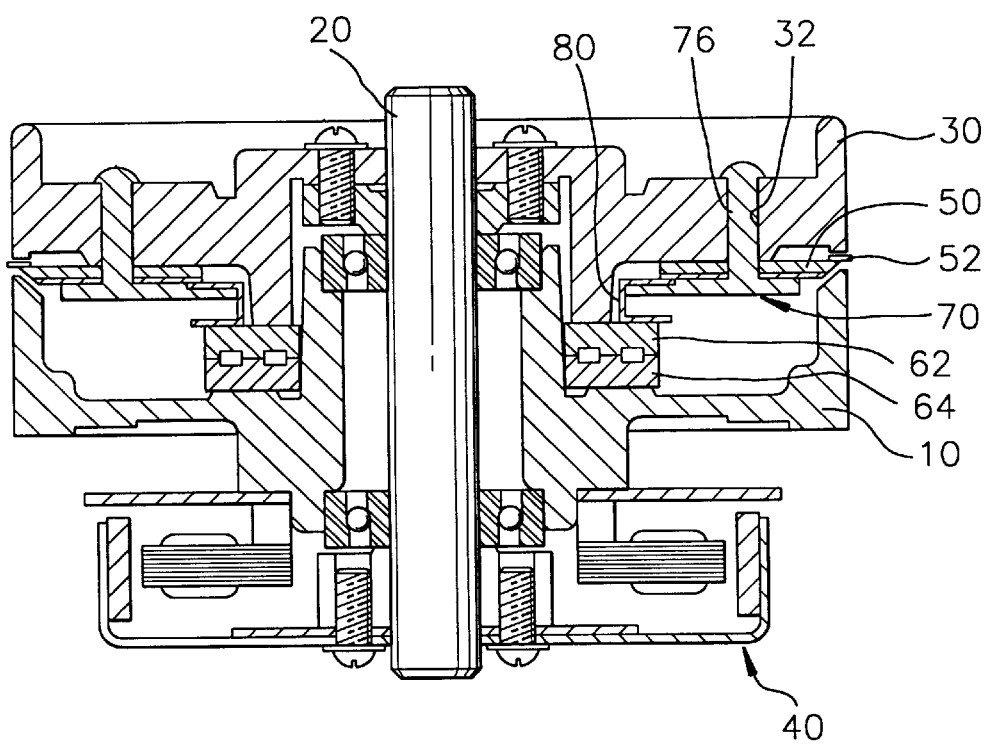
FIG. 3 depicts a sectional view of a head drum assembly in accordance with the present invention.
Figure 4:
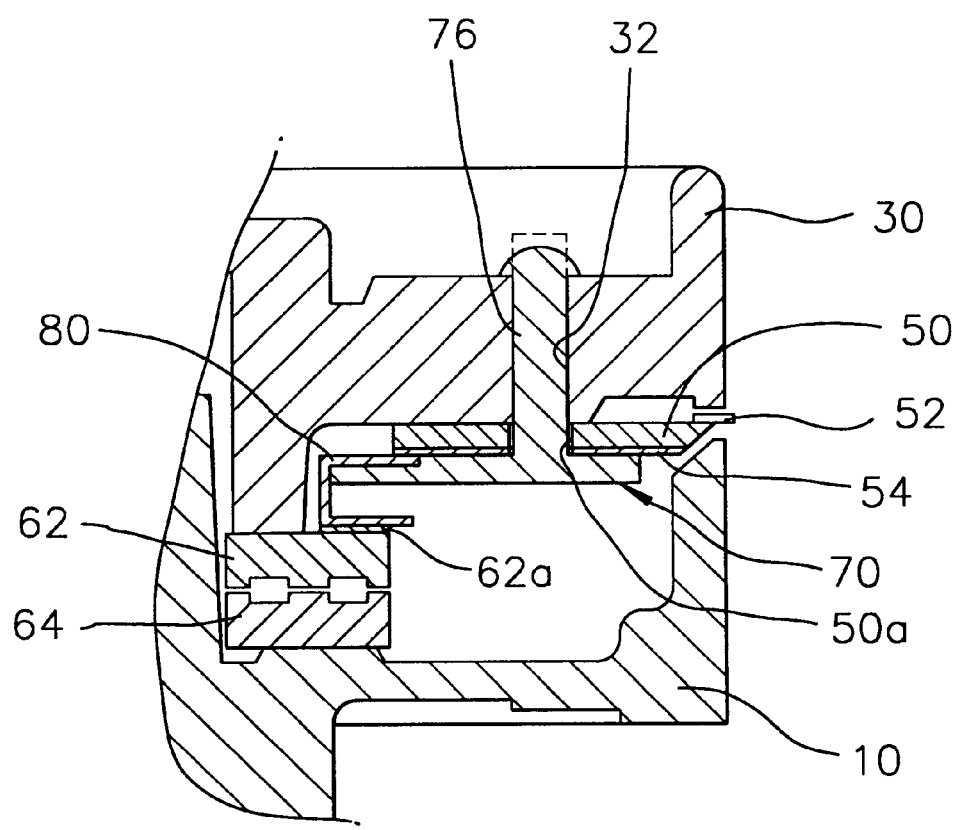
FIG. 4 represents a partially enlarged view of a head base retaining structure in FIG. 3.
Figure 5:
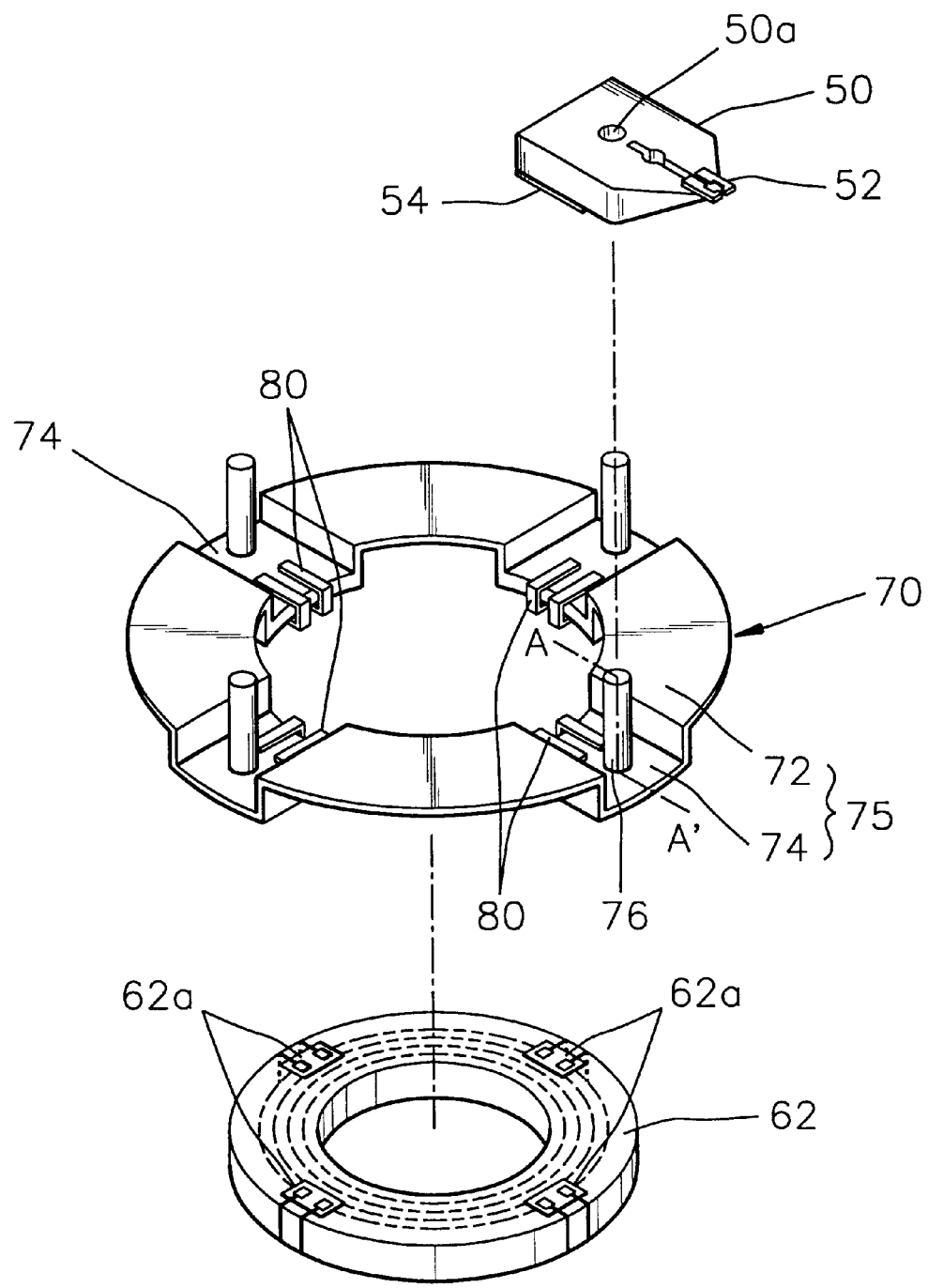
FIG. 5 provides a partially exploded view of the present invention.

With reference to FIGS. 3 to 5, described below is a head drum assembly, for use in a VCR, whose structure has been modified to ensure an easy and simple placement of each head base therein in accordance with a preferred embodiment of the present invention.

In FIGS. 3 and 4, a sectional view along line A–A' in FIG. 5 is disclosed. As shown in FIGS. 3 and 4, the head drum assembly comprises a stationary drum 10 fixed to a deck(not shown), a main shaft 20 passing through the stationary drum 10, a rotational drum 30 fixed to an upper end of the main shaft 20, a driving motor 40 for providing the rotating power to the main shaft 20. The main shaft 20 and the rotational drum 30 rotate together with the driving motor 40 relative to the stationary drum 10.

Further, the rotational drum 30 has at least one through hole 32 vertically formed therethrough. A head base 50 having a through hole 50a therethrough and having a video head 52 for reading/writing signals from/onto a magnetic tape(not shown) is fixed to a bottom surface of the rotational drum 30. A PCB (printed circuit board) 54 for transferring signals from/to the video head 52 is fixed under the head base 50.

A stator transformer 64 is installed in the stator transformer groove of the stationary drum 10. Further, a rotor transformer 62 having electrical contacts 62a formed on top thereof is attached to the protruding annular portion of the rotational drum 30. The transformers 64, 62 are capable of providing and receiving signals to and from each other. The number of the pairs of electrical contacts 62a is the same as that of the head bases 50, and hence the video head 52, on the head drum assembly.

Furthermore, the inventive head drum assembly is provided with a base locating member 70 including a disk 75 (in FIG. 5) and a plurality of posts 76 for fixing the disk 75 beneath the rotational drum 30.

FIG. 5 provides a partially exploded view of the present invention. As shown, the disk 75 has prominences 72 facing the bottom surface of the rotational drum 30 and depressions 74 for accommodating the head bases 50 therein. The numbers of the prominences 72 and the depressions 74 are the same as that of the head bases 50, respectively. According to the preferred embodiment of the present invention, the number of depressions 74 would be preferably four. The depressions 74 are equally spaced apart on the disk 75. The width of the depression 74 is the same or wider than the width of the head base 50 in order to accommodate the head base 50. Further, the depth of each depression 74 is less than the height of the head base 50 in order to allow the top surface of the head base 50 to come into a close contact with the bottom surface of the rotational drum 30.

The posts 76 integrally protrude from each of the depressions 74. The posts 76 are inserted into the through holes 32 of the rotational drum 30 via the through holes 50a of the head bases 50, respectively. Further, each of the posts 76 is of a length such that an upper end thereof protrudes above each of the through holes 32 after passing through the through holes 50a. The upper end from each of the posts 76 are then deformed by heat, as shown in FIG. 4, to thereby hold the base locating member 70 and the rotational drum 30 together.

In addition, the inventive head drum assembly is provided with the same number of pairs of connecting pins 80 as that of the head bases 50. Each pair of connecting pins 80 are used for electrically connecting the head base 50 to the rotor transformer 62.

Upper ends of the connecting pins 80 in each pair come in an electrical contact with the PCB 54 when the base locating member 70 is engaged with the rotational drum 30. The upper ends of each of the connecting pins 80 are partially inserted into the base locating member 70 during the formation of the member 70 by casting. Lower free ends of the connecting pins 80 in each pair comes into an electrical contact with the electrical contacts 62a.

The structure thus incorporated in the head drum assembly in accordance with the preferred embodiment of the present invention ensures an easy, simple and accurate placement of the head bases and at the same time eliminates the need for soldering the electrical wires.

Although the invention has been shown and described with respect to the preferred embodiment, it will be understood by those skilled in the art that various changes and modifications may be made without departing from the spirit and scope of the invention as defined in the following claims.

What is claimed is:

1. A head drum assembly comprising:
   at lease one head base having a through hole and a video head therein;
   a rotational drum having through holes;
   a base locating member fixedly attached to the rotating drum, said base locating member having posts thereon for locating each head base beneath the rotational drum;
   a rotor transformer having a plurality of electrical contacts thereon; and
   connecting pins for electrically connecting a printed circuit board fixed under each head base to the rotor transformer.

2. The head drum assembly of claim 1, wherein the base locating member is provided with:
   a disk having depressions for accommodating each of the head bases therein and prominences facing a bottom surface of the rotational drum; and
   the posts, integrally protruding from each of the depressions, for fixing the disk beneath the rotational drum.

3. The head drum assembly of claim 2, wherein the depressions are equally spaced apart on the disk.

4. The head drum assembly of claim 3, wherein the number of the depressions is four.

5. The head drum assembly of claim 2, wherein an upper end of each of the posts protrudes above each of the through holes after each thereof passes through each of the through holes.

6. The head drum assembly of claim 5, wherein the upper end is deformed by heat to hold the base locating means and the rotational drum together.

7. The head drum assembly of claim 1, wherein the upper ends and the lower ends of the connecting pins come into electrical contact with the printed circuit board and the electrical contacts on the rotor transformer, respectively.

8. A head drum assembly comprising:
   at least two video heads, each of the video heads divided into a head and a head base and having a printed circuit board fixed to a lower surface thereof and a post hole formed therethrough;
   a rotational drum having a same number of through holes as that of the video heads;
   an integrated base locating means for locating and fixing the head base beneath the rotational drum, including a disk having prominences facing a bottom surface of the rotational drum and a same number of depressions as that of the video heads, the depressions accommodating the head bases therein, respectively, each of the depressions provided with a post being inserted into one of the through holes of the rotational drum through the post hole;
   a rotor transformer having a same number of electrical contacts thereon as that of the video heads; and
   a same number of connecting pins as that of the video heads, each of the connecting pins for electrically connecting one of the printed circuit boards to one of the electrical contacts of the rotor transformer.

9. The head drum assembly of claim 8, wherein said depressions are angularly equally spaced apart on the disk.

10. The head drum assembly of claim 9, wherein the number of the depressions is four.

* * * * *